United States Patent
Kato

(10) Patent No.: US 8,300,254 B2
(45) Date of Patent: Oct. 30, 2012

(54) PRINTER

(75) Inventor: Hiroshi Kato, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 364 days.

(21) Appl. No.: 12/613,687

(22) Filed: Nov. 6, 2009

(65) Prior Publication Data

US 2010/0110493 A1 May 6, 2010

(30) Foreign Application Priority Data

Nov. 6, 2008 (JP) ................................. 2008-285449

(51) Int. Cl.
G06F 3/12 (2006.01)
G06K 15/00 (2006.01)
G06F 3/048 (2006.01)

(52) U.S. Cl. ..................... 358/1.15; 358/1.16; 358/1.17; 358/1.12; 715/838; 715/765; 715/788

(58) Field of Classification Search .................. 358/296, 358/1.15, 1.16, 1.17, 1.12; 382/280; 715/838, 715/765, 788

See application file for complete search history.

(56) References Cited

U.S. PATENT DOCUMENTS

| | | | | |
|---|---|---|---|---|
| 5,165,031 A * | 11/1992 | Pruul et al. | ....................... | 714/25 |
| 5,587,808 A | 12/1996 | Hagihara et al. | | |
| 5,883,722 A * | 3/1999 | Baumler | ....................... | 358/296 |
| 6,421,138 B1 * | 7/2002 | McIntyre | ..................... | 358/1.16 |
| 6,711,292 B2 * | 3/2004 | Wang | ............................ | 382/199 |
| 7,058,238 B2 * | 6/2006 | Lei | ................. | 382/280 |
| 7,159,193 B2 * | 1/2007 | Wada | ........................... | 715/838 |
| 7,581,894 B2 * | 9/2009 | Sharma et al. | .................. | 400/62 |
| 7,769,200 B2 * | 8/2010 | Hamatake et al. | ............ | 382/100 |
| 7,965,404 B2 * | 6/2011 | Sharma et al. | ............... | 358/1.15 |
| 8,006,276 B2 * | 8/2011 | Nakagawa et al. | ........... | 725/105 |
| 2008/0112003 A1 * | 5/2008 | Sasama | ......................... | 358/1.9 |

FOREIGN PATENT DOCUMENTS

| | | |
|---|---|---|
| JP | 08-051537 | 2/1996 |
| JP | 2001-043363 | 2/2001 |
| JP | 2003-067174 | 3/2003 |
| JP | 2005-196260 | 7/2005 |
| JP | 2006303563 A | 11/2006 |
| JP | 2007068100 A | 3/2007 |
| JP | 2007-148505 | 6/2007 |

OTHER PUBLICATIONS

Notification of Reasons for Rejection for Japanese Application No. 2008-285449 mailed Oct. 19, 2010.

* cited by examiner

*Primary Examiner* — Akwasi M Sarpong
(74) *Attorney, Agent, or Firm* — Banner & Witcoff, Ltd.

(57) ABSTRACT

A printer, which is configured to be connected communicably with a storage device, includes a printing unit configured to print one or more pages with images formed thereon, based on print data, a thumbnail creating unit configured to create thumbnail image data corresponding to each of the pages to be printed by the printing unit, a storage controller configured to store, into the storage device, the thumbnail image data created by the thumbnail creating unit, and a print controller configured to, responsive to the thumbnail image data being successfully stored into the storage device, control the printing unit to print a page corresponding to the thumbnail image data successfully stored.

12 Claims, 11 Drawing Sheets

| PAGE | TEXT INFORMATION | IMAGE INFORMATION | CHARACTER STRING |
|---|---|---|---|
| 1 | 1 | 0 | 0 |
| 2 | 1 | 0 | 0 |
| 3 | 0 | 1 | 0 |
| 4 | 1 | 0 | 0 |
| 5 | 1 | 0 | 0 |
| 6 | 1 | 0 | 0 |
| 7 | 1 | 0 | 1 |
| 8 | 1 | 0 | 0 |
| ⋮ | ⋮ | ⋮ | ⋮ |

| PAGE | TEXT AREA | IMAGE AREA | DETERMINATION |
|---|---|---|---|
| 1 | 60 | 0 | - |
| 2 | 50 | 0 | 0 |
| 3 | 45 | 10 | 0 |
| 4 | 50 | 35 | 1 |
| 5 | 80 | 0 | 1 |
| 6 | 10 | 50 | 1 |
| 7 | 20 | 35 | 0 |
| 8 | 25 | 65 | 1 |
| ⋮ | ⋮ | ⋮ | ⋮ |

PRINTER

CROSS-REFERENCE TO RELATED APPLICATION

This application claims priority under 35 U.S.C. §119 from Japanese Patent Application No. 2008-285449 filed on Nov. 6, 2008. The entire subject matter of the application is incorporated herein by reference.

BACKGROUND

1. Technical Field

The following description relates to one or more printers configured to perform printing based on print data.

2. Related Art

So far, an image formation management system (a printer management system) has been known in which in order to grasp a usage status of an image forming device (a printer), after execution of a printing operation (an image forming operation) based on a print job, information on the number of sheets printed based on the print job and a user who has issued the print command is stored into a print server as history information.

SUMMARY

However, the above image formation management system has a problem that the user cannot confirm what kind of texts or images have been printed. Further, the history information is written into the print server after execution of the print job. Therefore, for instance, when any trouble occurs in at least one of the print server and the image forming device during execution of the print job based on which a printing operation is to be performed on multiple sheets, no history information on the print job is saved in the print server. Thus, it is impossible to adequately grasp the usage status of the image forming device.

Aspects of the present invention are advantageous to provide one or more improved printers that make it possible for a user to adequately grasp an execution history of a print job.

According to aspects of the present invention, a printer is provided which is configured to be connected communicably with a storage device. The printer includes a printing unit configured to print one or more pages with images formed thereon, based on print data, a thumbnail creating unit configured to create thumbnail image data corresponding to each of the pages to be printed by the printing unit, a storage controller configured to store, into the storage device, the thumbnail image data created by the thumbnail creating unit, and a print controller configured to, responsive to the thumbnail image data being successfully stored into the storage device, control the printing unit to print a page corresponding to the thumbnail image data successfully stored.

BRIEF DESCRIPTION OF THE ACCOMPANYING DRAWINGS

FIG. 1 is a block diagram schematically showing a configuration of a printing system in a first embodiment according to one or more aspects of the present invention.

FIG. 2 exemplifies a display shown on a thumbnail display screen in the first embodiment according to one or more aspects of the present invention.

FIG. 3 exemplifies a display shown on the thumbnail display screen in the first embodiment according to one or more aspects of the present invention.

Figures 5, 6:
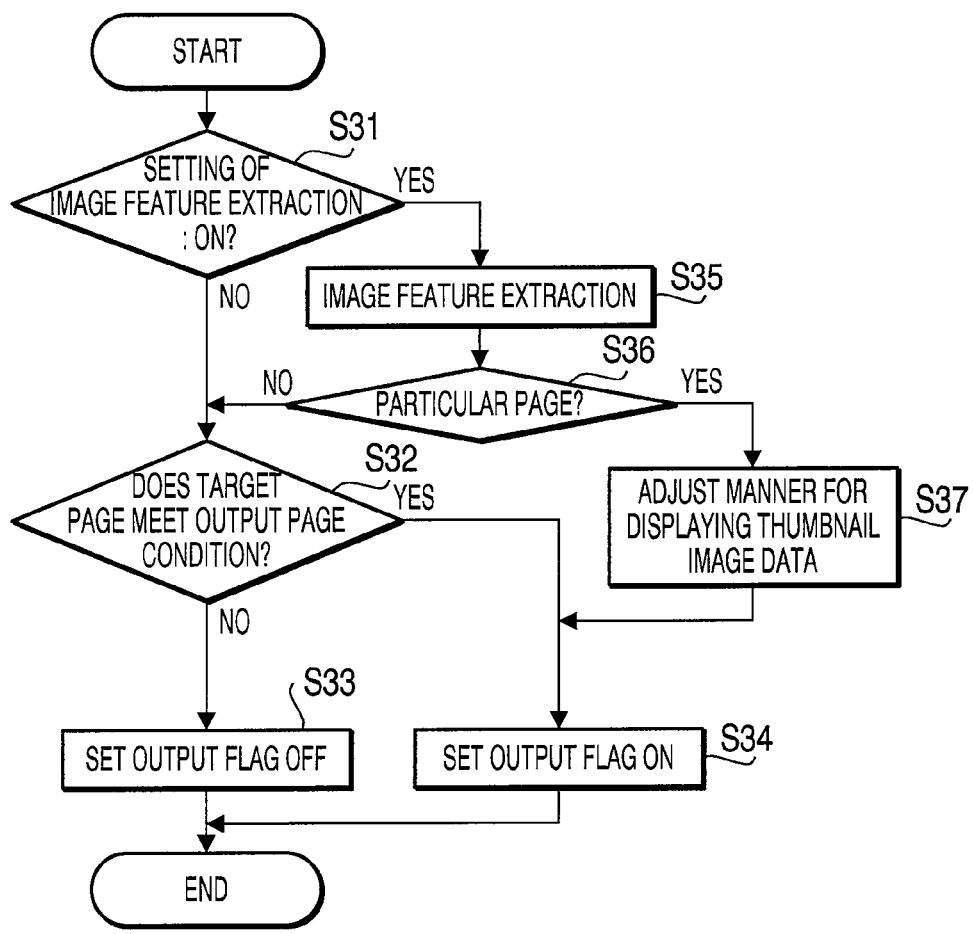
FIG. 5 is a flowchart showing a procedure of a transmission determining process to be executed by the controller of the printer in the first embodiment according to one or more aspects of the present invention.

FIG. 6 exemplifies a data table stored on a storage unit of the printer in the first embodiment according to one or more aspects of the present invention.

Figure 7:
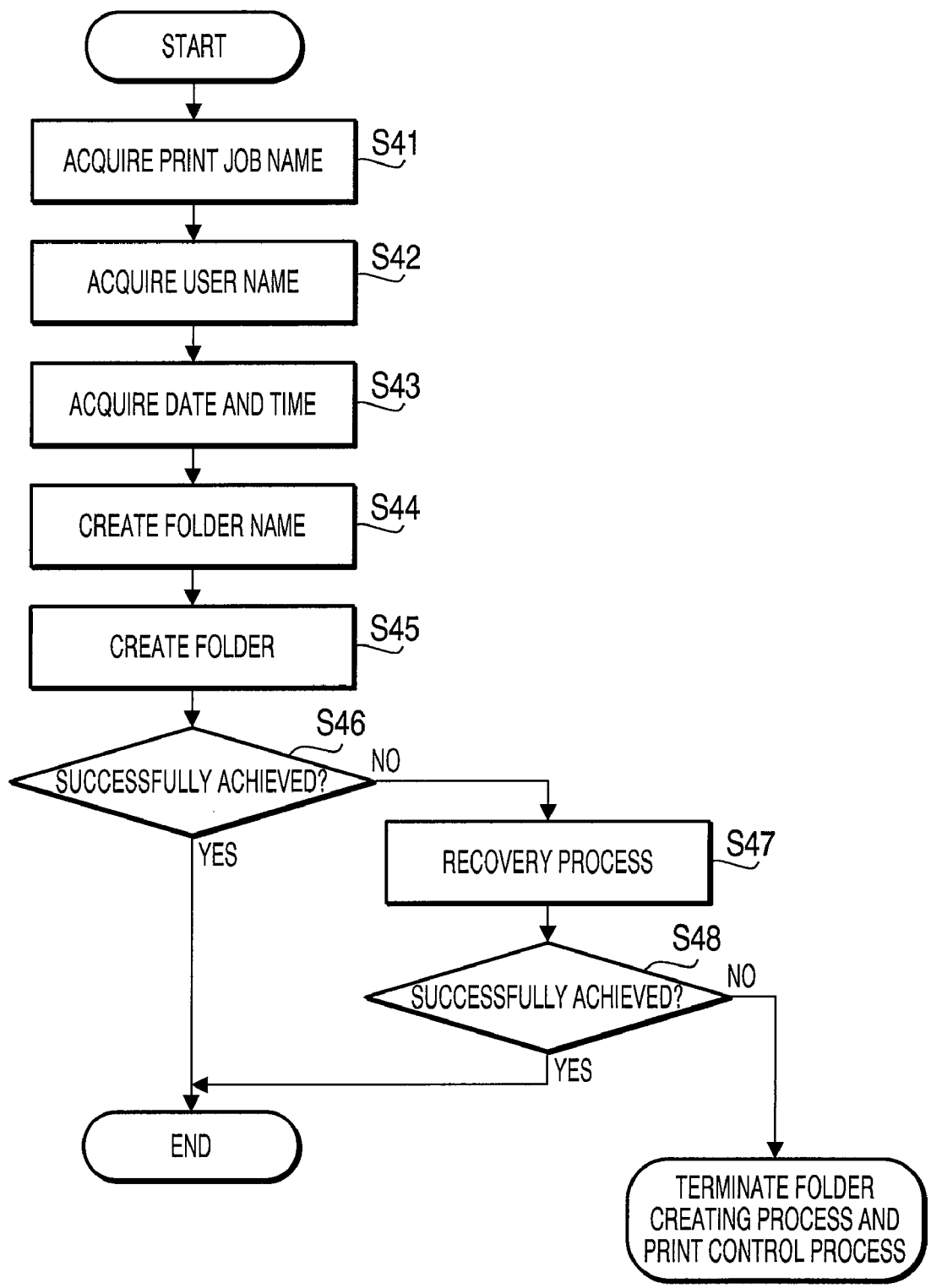

FIG. 7 is a flowchart showing a procedure of a folder creating process to be executed by the controller of the printer in the first embodiment according to one or more aspects of the present invention.

Figure 8:
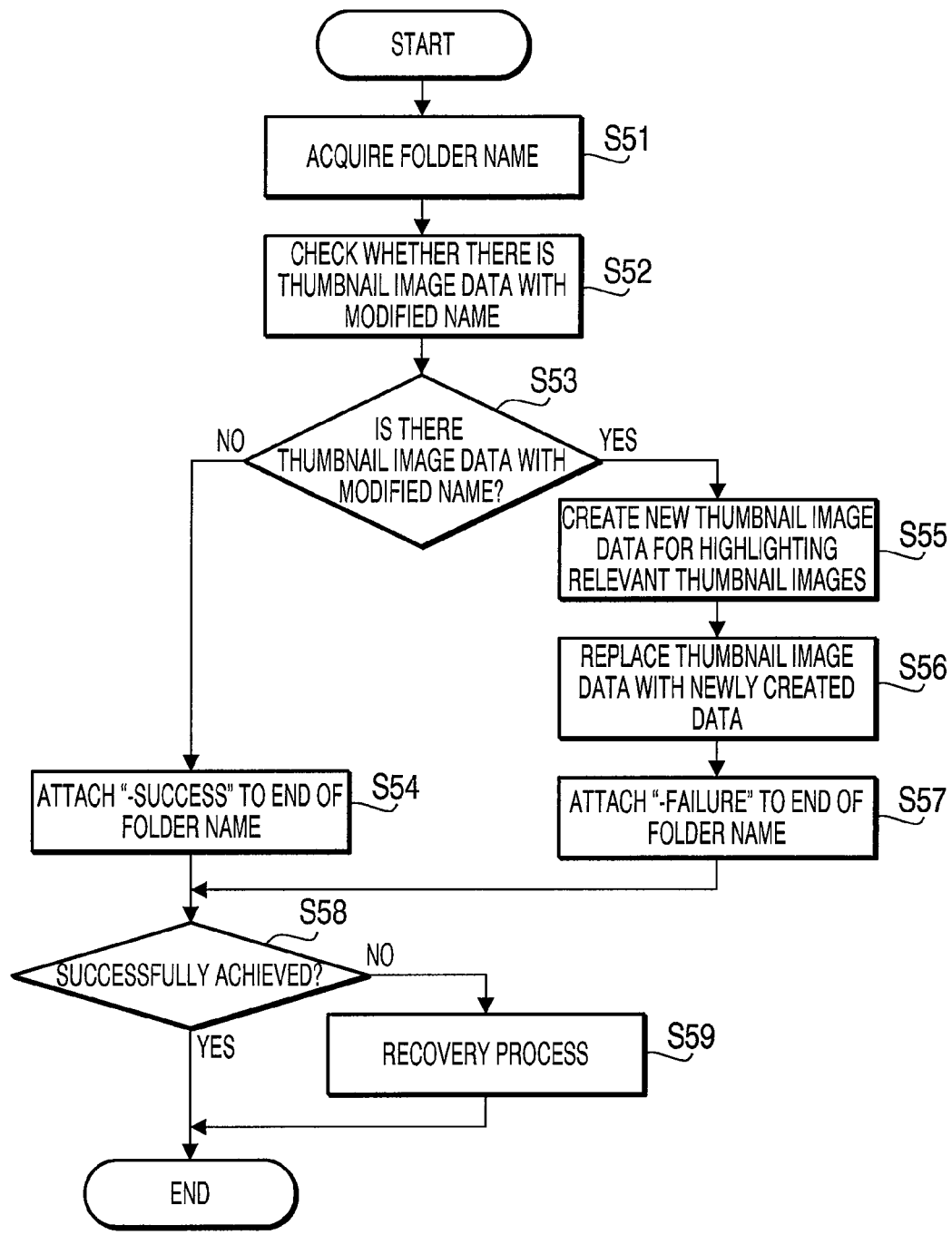

FIG. 8 is a flowchart showing a procedure of a print completing process to be executed by the controller of the printer in the first embodiment according to one or more aspects of the present invention.

Figure 9:
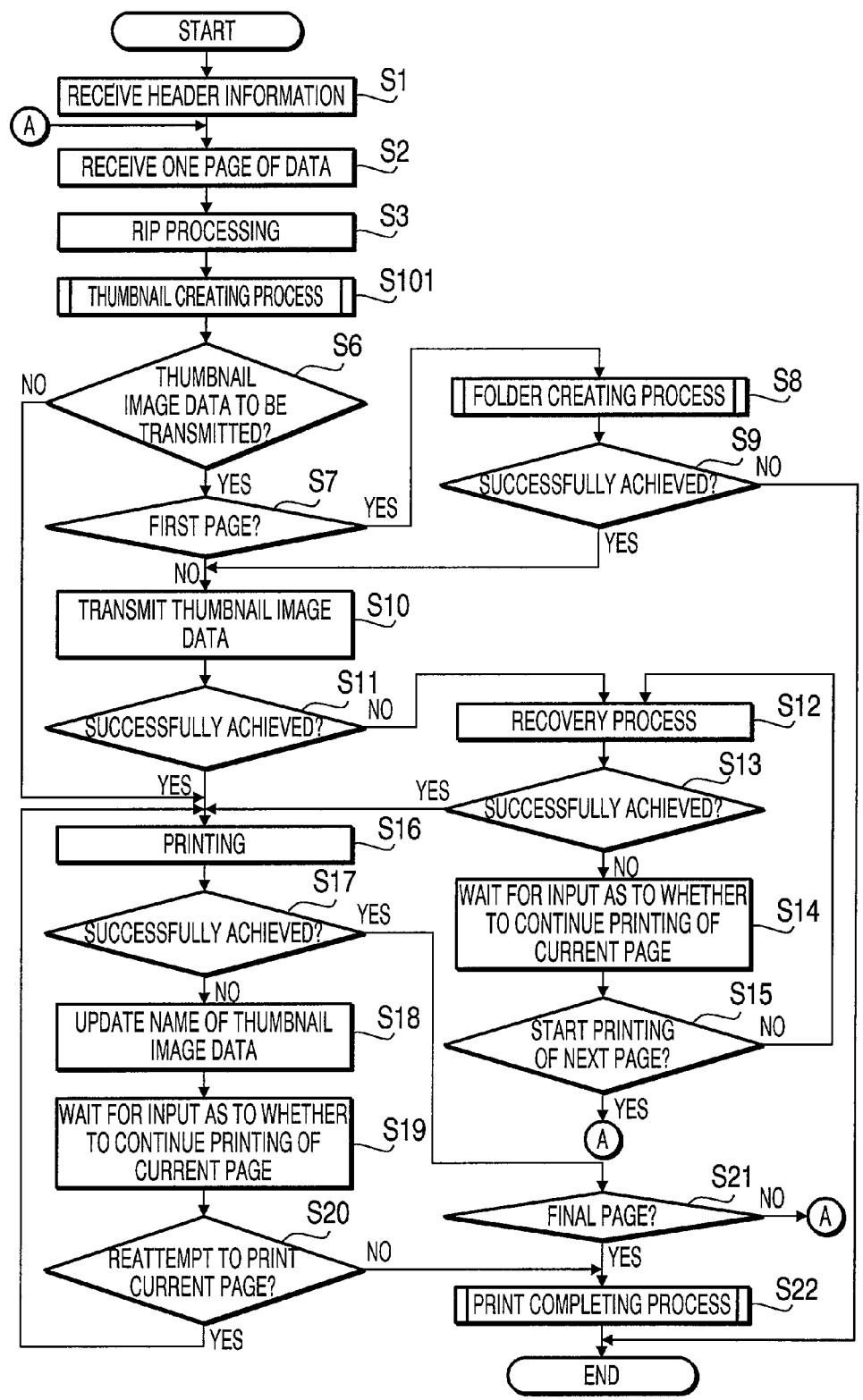

FIG. 9 is a flowchart showing a procedure of a print control process to be executed by a controller of a printer in a second embodiment according to one or more aspects of the present invention.

Figure 10:
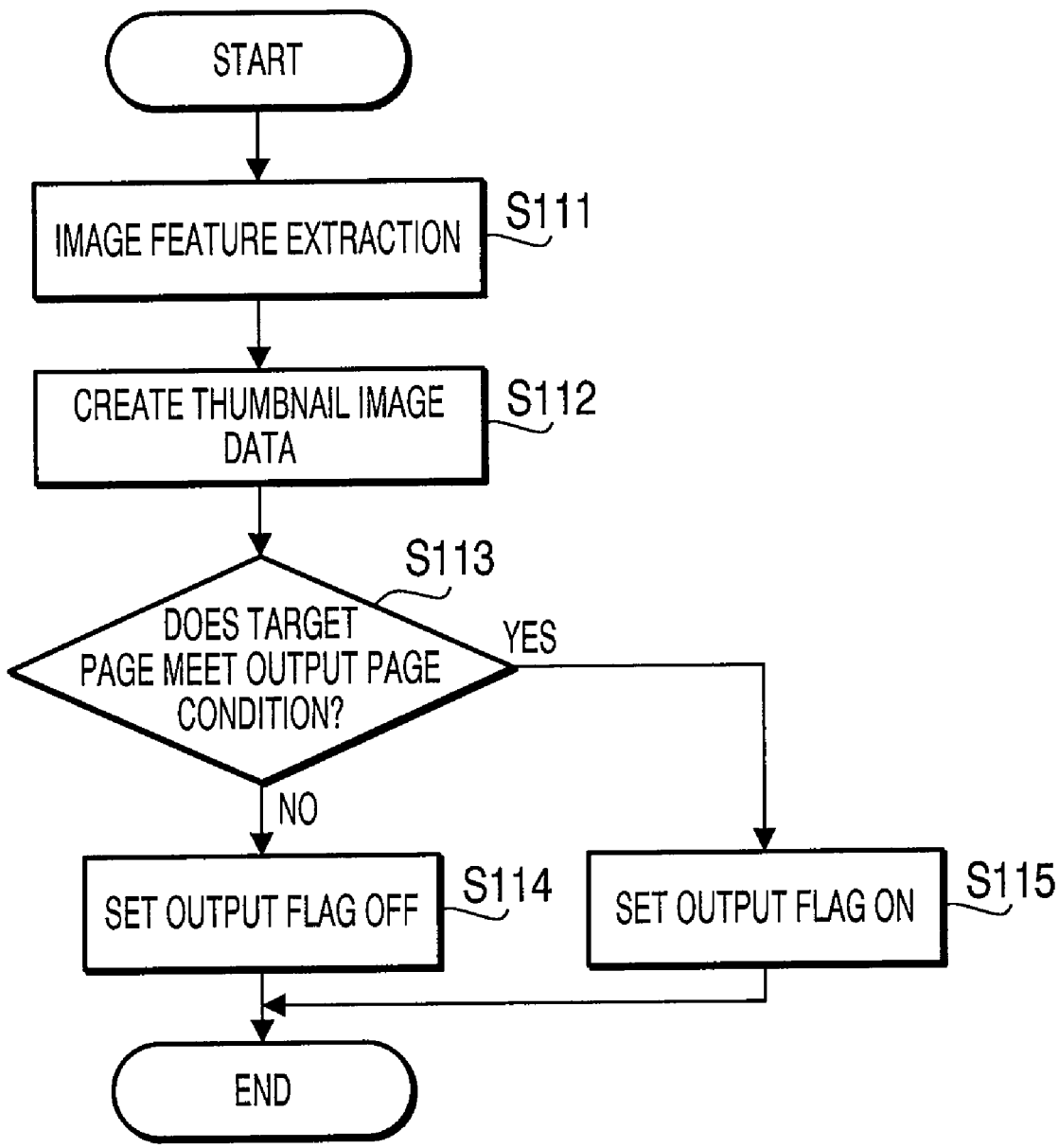

FIG. 10 is a flowchart showing a procedure of a thumbnail creating process to be executed by the controller of the printer in the second embodiment according to one or more aspects of the present invention.

Figure 11:
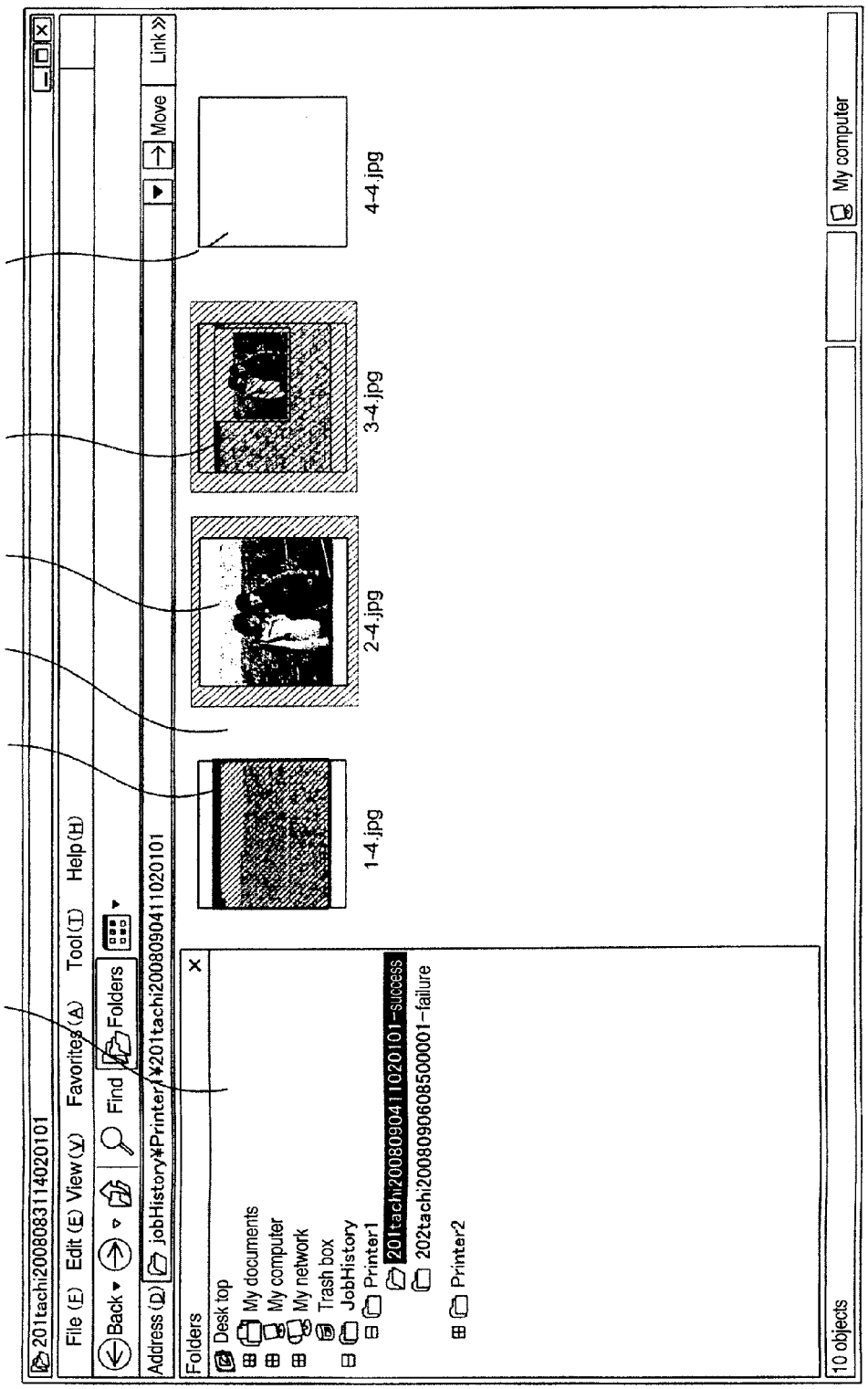

FIG. 11 exemplifies a display shown on a thumbnail display screen in the second embodiment according to one or more aspects of the present invention.

Figures 12, 13:
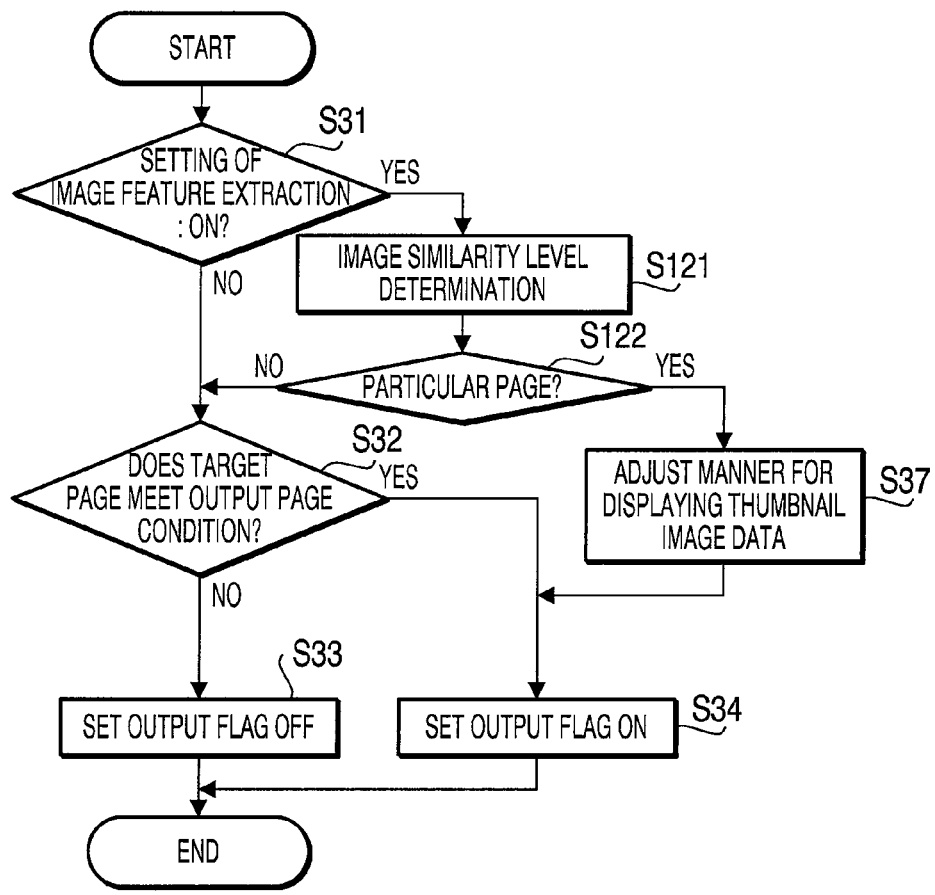

FIG. 12 is a flowchart showing a procedure of a transmission determining process to be executed by a controller of a printer in a third embodiment according to one or more aspects of the present invention.

FIG. 13 exemplifies a data table stored on a storage unit of a printer in the third embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like. Hereinafter, embodiments according to aspects of the present invention will be described with reference to the accompanying drawings.

First Embodiment (1. 1) Overall Configuration

Figure 1:
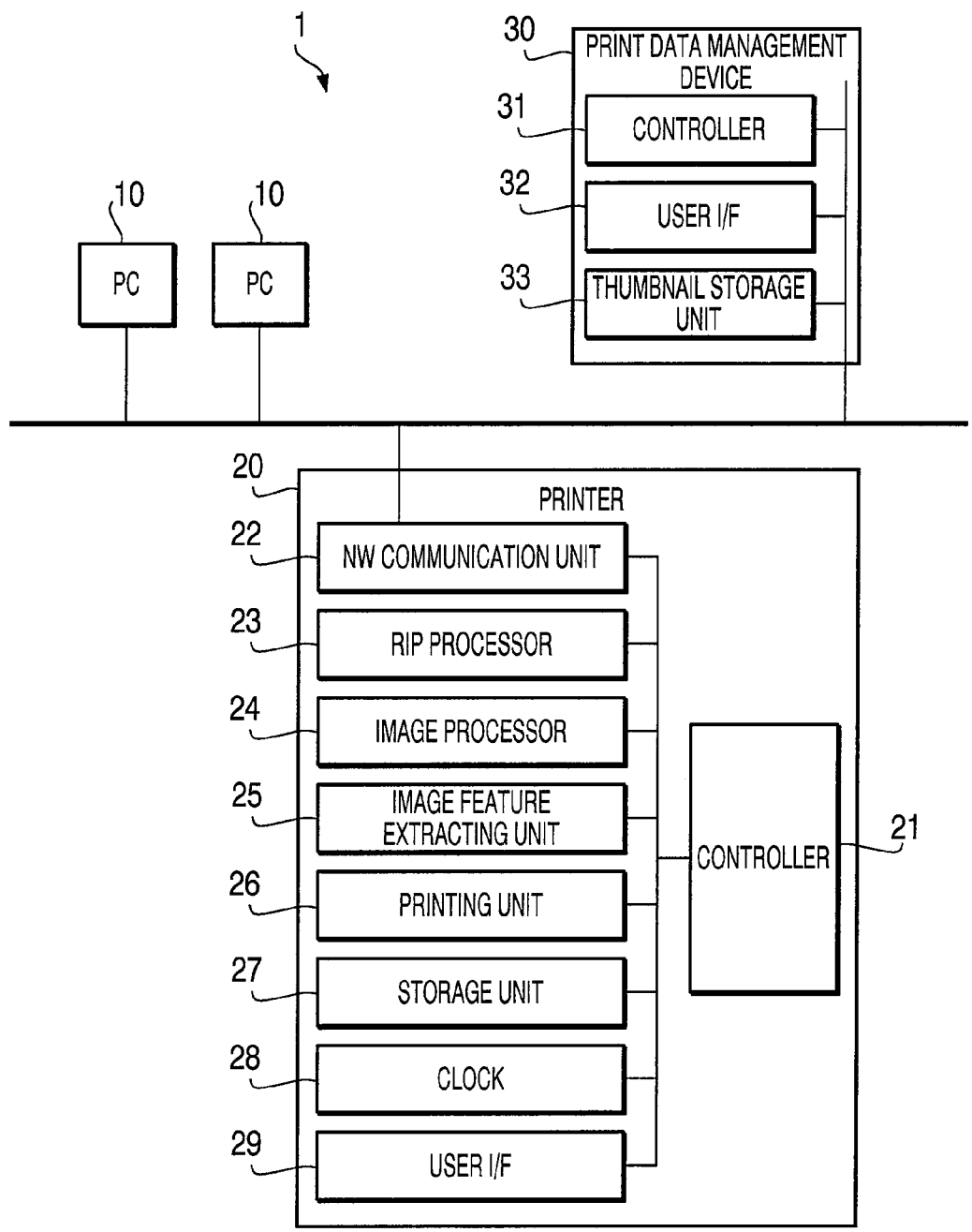

As illustrated in FIG. 1, a printing system 1 includes personal computers (PCs) 10, a printer 20, and a print data management device 30, which are interconnected via a network 2 such as the Internet and a LAN. In the printing system 1, the printer 20 prints an image based on print data output from a PC 10, and image data of a reduced image of a page created based on the print data, i.e., thumbnail image data is stored into the print data management device 30.

Each of the PCs 10 is a general computer system provided with a display device configured to display an image thereon, and an input device such as a keyboard and a mouse. Each PC 10 is configured to create print data using application software and transmit the created print data to the printer 20 via the network 2.

The printer 20 is configured to create thumbnail image data based on the print data transmitted by the PC 10 via the network 2, transmit the thumbnail image data to the print data management device 30, and form an image based on the print data on a printing medium such as a sheet.

The printer 20 includes a controller 21, a network (NW) communication unit 22, a RIP processor 23, an image processor 24, an image feature extracting unit 25, a printing unit 26, a storage unit 27, a clock 28, and a user interface (I/F) 29.

The controller 21 is configured with a microcomputer that includes a CPU, a ROM, and a RAM, and adapted to take overall control of each element included in the printer 20. In addition, the controller 21 is configured to perform each of below-mentioned processes in accordance with an application program and various data loaded from the aforementioned ROM and/or the storage unit 27.

The network communication unit 22 is configured to perform data communication with an external device via a network cable connected thereto. Thereby, the printer 20 can perform data communication with the PCs 10 and the print data management device 30.

The RIP processor 23 is configured to create raster data (bitmap image data) from the print data. The raster data is created as a single data file for each page based on the print data.

The image processor 24 is configured to create thumbnail image data from the raster data created by the RIP processor 23. The thumbnail image data may be created in a method, such as a nearest neighbor method, in which the raster data is reduced with pixels thereof simply thinned out. Alternatively, the thumbnail image data may be created in a method, such as a bi-linear interpolation method and a bi-cubic convolution method, in which the raster data is reduced by interpolating between pixels.

The image feature extracting unit 25 is configured to extract image feature information of each page included in the print data, which corresponds to the thumbnail image data created by the image processor 24. Specifically, the image feature extracting unit 25 determines in one of known methods how much share, on each page, a text area containing text information and an image area containing image information account for, respectively, and whether a predetermined character string is included in each page.

The printing unit 26 is configured to print a color image on a sheet based on the raster data created by the RIP processor 23.

The storage unit 27 is provided with a hard disk drive (HDD, not shown). The HDD includes a storage area to store header information, a storage area to temporarily store thumbnail image data of an image being printed, and a storage area to store various programs such as a program for causing the controller 2 to execute each of below-mentioned processes.

The user I/F 29 includes various operation buttons (not shown) for inputting a user command therethrough, and a liquid crystal display (LCD) (not shown) for displaying thereon various kinds of information for the user. The user I/F 29 transmits to the controller 21 the user command input through one or more operation buttons. In addition, the user interface I/F 29 displays, on the LCD, information such as a message and an image, based on a command from the controller 21.

The print data management device 30 includes a controller 31, a user interface (I/F) 32, and a thumbnail storage unit 33. The print data management device 30 is configured to store the thumbnail image data transmitted by the printer 20 via the network 2 and display, on a below-mentioned LCD, a thumbnail image based on the thumbnail image data.

The controller 31 is configured with a microcomputer that includes a CPU, a ROM, and a RAM, and adapted to take overall control of each element included in the print data management device 30.

The user I/F 32 is provided with various input devices (not shown), such as a mouse and a keyboard, for inputting a user command therethrough, and an LCD (not shown) for displaying thereon various information for the user. Then, the user I/F 32 transmits to the controller 31 the user command input through one of the input devices, and displays, on the LCD, information such as a message and an image based on a command from the controller 31.

Additionally, the user I/F 32 is adapted to configure settings such as an output page condition and a setting as to whether to perform an image feature extraction. Thus, the user of the print data management device 30 previously configures the settings through the user I/F 32.

The aforementioned output page condition is for setting at intervals of how many pages the thumbnail image data of a target page is to be stored as a record of a history when a printing operation is performed with the printer 20. Specifically, using the output page condition, it is possible to set the number of pages (a page interval), at intervals of which (e.g., every page, every five pages, every ten pages, etc.) the thumbnail image data is to be stored. Further, the image feature extraction is for determining whether a target page is a particular page of which the thumbnail image data is to be stored, on the basis of information on the target page that is extracted by the image feature extracting unit 25. The particular page represents a page which has contents remarkably different from those of the last (previously adjacent) page or a page which has a predetermined character string written thereon. It is noted that the settings, input through the user I/F 32, as to the output page condition and the image feature extraction are transmitted to the printer 20 and stored on the storage unit 27.

The thumbnail storage unit 33 is configured with an HDD (not shown). The thumbnail image data transmitted by the printer 20 is stored in a storage area of the HDD.

(1. 2) Display of Thumbnail Image Data

Figure 2:
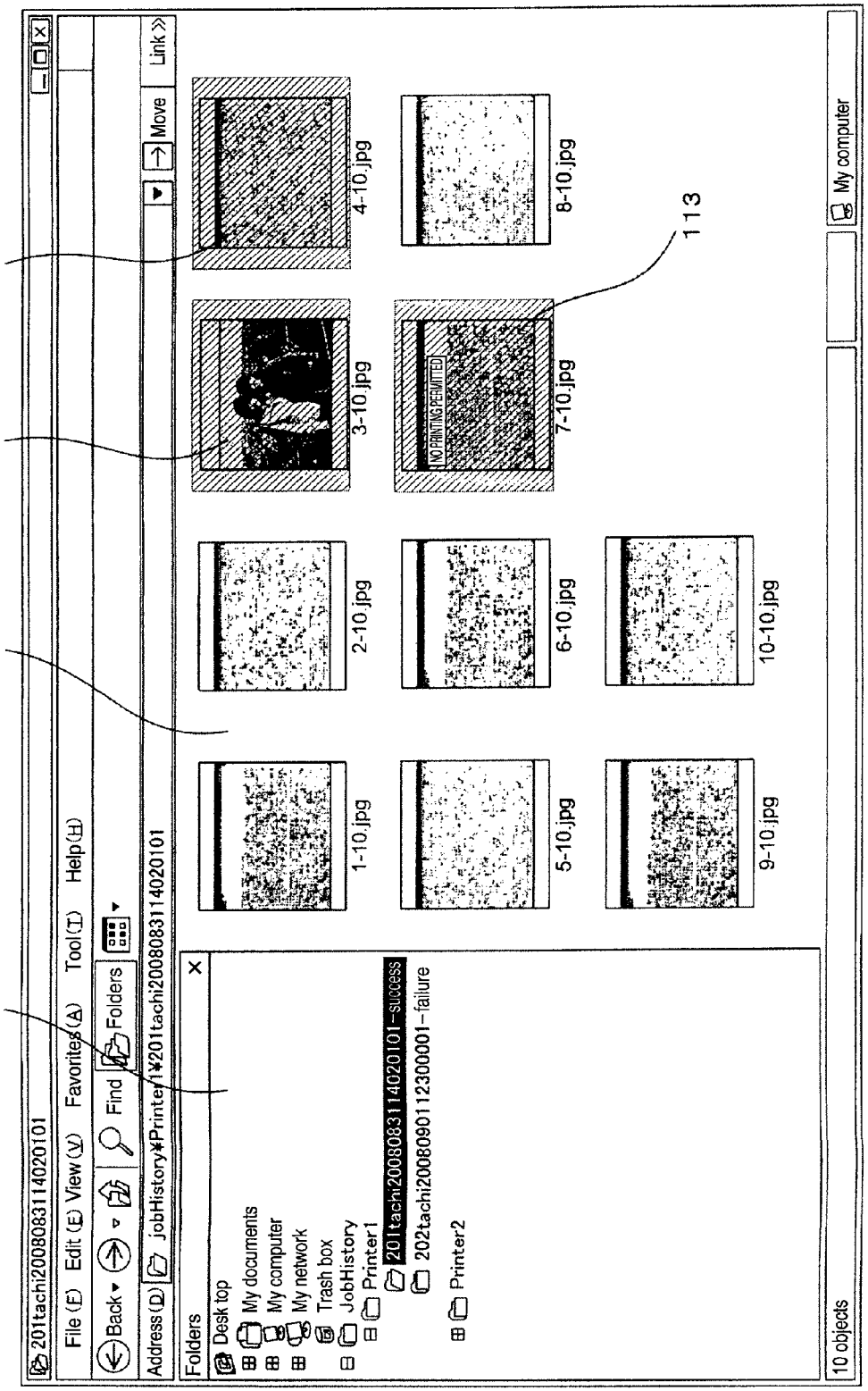

A thumbnail display screen, exemplified in FIG. 2, is displayed on the LCD of the user I/F 32 of the print data management device 30, when a user operation for displaying the history is provided through an input device of the user I/F 32.

As illustrated in FIG. 2, the thumbnail display screen includes a tree area A to show a tree structure of directories and a thumbnail area B to show thumbnail images.

In the thumbnail area B, displayed are thumbnail images based on thumbnail image data which is stored in a folder selected in the tree area A.

In FIG. 2, thumbnail images are displayed in the thumbnail area B, based on thumbnail image data stored in a folder "201tachi2008083114020101-success" in a folder "Printer1" created in a folder "JobHistory."

The folder "JobHistory," among the above folders, is for storing a history of all print jobs. Therefore, the history (thumbnail image data) of all print jobs is store in the folder.

Further, "Printer1" denotes the name of a printer that executed the print jobs. Moreover, "201tachi2008083114020101-success" represents a job ID (201), a user name (tachi), date and time (2008083114020101), and the result of the print job (success). Thus, from the folder name, it is possible to acquire information on the print job, the name of the user who performed a printing operation based on the print job, the date and time when this folder was created, and the result of the printing operation.

In the thumbnail area B, thumbnail images of successfully-printed pages or pages which the printer 20 has failed to print are displayed as records of the print history. The name of each thumbnail image is created as "(a page number of the image)-(a total number of pages)." In the print job exemplified in FIG. 2, printing of ten pages is performed (i.e., the total number of pages is ten).

Among the thumbnail images displayed in the thumbnail area B, the following three pages are highlighted with images and surrounding areas thereof being colored: a page "3-10.jpg" (111 in FIG. 2) which mainly contains a picture unlike previous pages mainly containing text, a page "4-10.jpg" (112 in FIG. 2) which mainly contains text unlike the previous page mainly containing the picture, and a page "7-10.jpg" (113 in FIG. 2) which has characters "NO PRINTING PERMITTED" written thereon.

Figure 3:
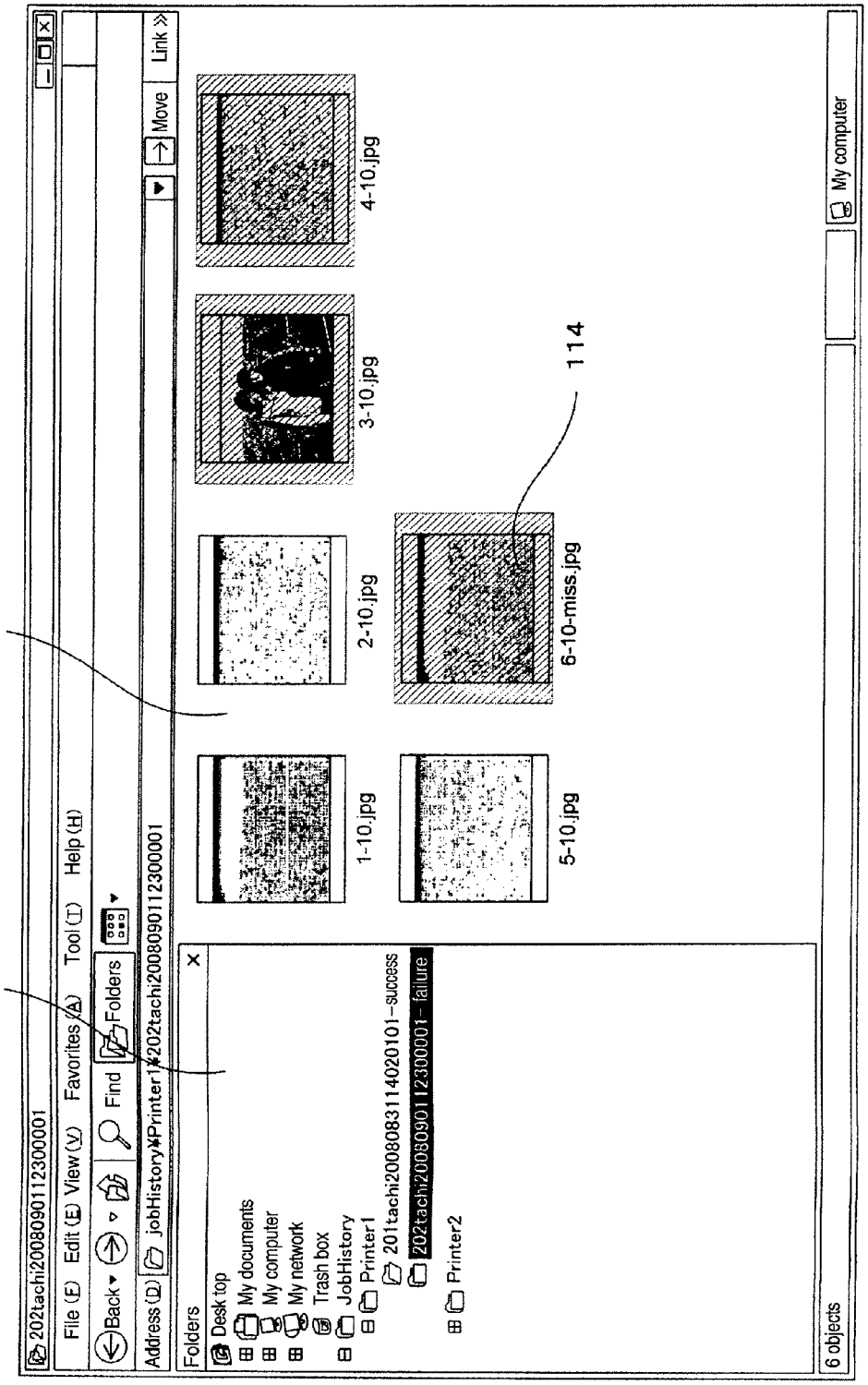

FIG. 3 illustrates a display screen that shows thereon thumbnail images in a different folder from the aforementioned folder.

As shown in the tree area A of FIG. 3, the folder has a name "202tachi2008090112300001-failure." The folder name includes "failure," which means that a print job corresponding to records (thumbnail images) in the folder has not normally completed (i.e., at least one of pages to be printed in the print job has not successfully been printed).

In FIG. 3, the thumbnail area B shows therein thumbnail images for six of ten pages. A sixth page of thumbnail image (104 in FIG. 3) is shown with a name "6-10-miss" in a highlighted manner, which means that printing of the page has not successfully been achieved.

Instead of changing the color of a thumbnail image as mentioned above, the thumbnail image may be highlighted with the size or shape thereof being changed or displayed as an animated image.

(1. 3) Processes by Printer

Hereinafter, an explanation will be given about various processes to be executed by the controller 21 of the printer 20.

(1. 3. 1) Print Control Process

Figure 4:
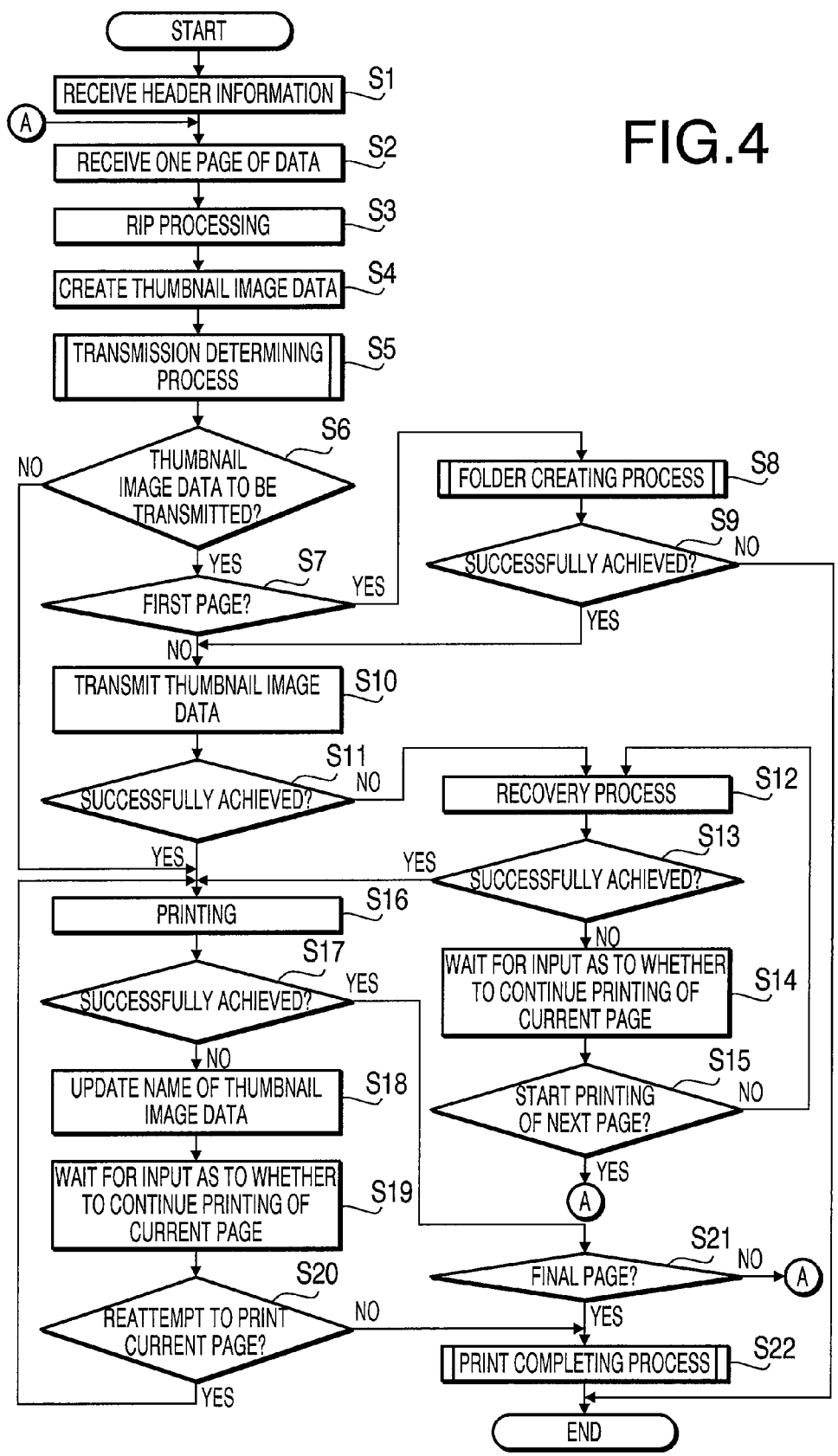
FIG. 4 is a flowchart showing a procedure of a print control process to be executed by a controller of a printer in the first embodiment according to one or more aspects of the present invention.

A procedure of a print control process will be described with reference to FIG. 4. The print control process is a process adapted to, in response to receipt of print data from the PC 10, store thumbnail images based on the print data into the thumbnail storage unit 33 of the print data management device 30, and print images based on the print data in response to the thumbnail images being successfully stored. The print control process is performed each time the printer 20 receives print data from the PC 10.

In the print control process, the controller 21 initially receives header information of print data (S1). The print data includes the header information (which contains the name of the print job, the name of a user who has issued an instruction to send the print data, and the total number of pages to be printed) and print target data which the user desires to print. The received header information is stored on the storage unit 27.

Subsequently, the controller 21 receives a minimum amount of data (a page of data, hereinafter referred to as page data) required for execution of the printing (S2). In this step, the controller 21 receives un-received data of the print target data.

Next, the controller 21 performs RIP processing for the page data received in S2 (S3). Thereby, a page of raster data is created. Then, based on the created raster data, thumbnail image data is created (S4). At this time, the controller 21 attaches a name "(a page number)-(a total number of pages of print data)" to the thumbnail image data. The page number denotes a numerical value that indicates a page order of the created thumbnail image data. The created thumbnail image data is temporarily stored on a RAM of the controller 21. When there is thumbnail image data already stored on the RAM, it is overwritten and updated with the newly created thumbnail image data.

Next, the controller 21 performs a transmission determining process (S5). Although a detailed explanation of it will be given later, the controller 21 determines in S5 whether to transmit and store the thumbnail image data created in S4 into the print data management device 30.

Subsequently, the controller 21 determines whether it is determined in the transmission determining process that the thumbnail image data is to be transmitted (S6). Specifically, the controller 21 determines whether a thumbnail transmission flag is set ON in the below-mentioned transmission determining process. When it is determined in the transmission determining process that the thumbnail image data is not to be transmitted (S6: No), i.e., when the thumbnail transmission flag is set OFF, the controller 21 goes to S16.

Meanwhile, when it is determined in the transmission determining process that the thumbnail image data is to be transmitted (S6: Yes), i.e., when the thumbnail transmission flag is set ON, the controller 21 determines whether the page data received in S2 corresponds to a first page of the print job (S7). When the page data received in S2 does not correspond to the first page of the print job (S7: No), the controller 21 goes to S10. Meanwhile, when the page data received in S2 corresponds to the first page of the print job (S7: Yes), the controller 21 performs a folder creating process, in which the controller 21 creates a folder which corresponds to the print data for the print job, in the thumbnail storage unit 33 of the print data management device 30 (S8). The folder creating process will be described in detail below.

When the folder creation in S8 is not successfully achieved (S9: No), i.e., when any folder is not created in a predetermined storage area due to a failure in communication between the printer 20 and the print data management device 30 or a malfunction of the thumbnail storage unit 33, the controller 21 terminates the print control process. In this case, the controller 21 does not perform printing or store the thumbnail image data, and the transmitted print data is discarded. Meanwhile, when the folder creation in S8 is successfully achieved (S9: Yes), the controller 21 goes to S9.

Subsequently, the controller 21 transmits the thumbnail image data to the print data management device 30 (S10). In this step, the controller 21 stores, into the folder created in S8, the thumbnail image data stored in the RAM of the controller 21. It is noted that after storing the thumbnail image data into the aforementioned folder, the controller 21 stores the same thumbnail image data into a thumbnail storage area of the storage unit 27, and deletes the thumbnail image data stored on the RAM.

When the transmission of the thumbnail image data in S10 is successfully achieved (S11: Yes), the controller 21 goes to S16. Meanwhile, when the transmission of the thumbnail image data in S10 is not successfully achieved (S11: No), the controller 21 performs a recovery process (S12). In the recovery process, the controller 21 retries to transmit the thumbnail image data up to a predetermined number of times. When the transmission of the thumbnail image data is successfully achieved within the predetermined number of retries (S13: Yes), the controller 21 goes to S16.

Meanwhile, when the transmission of the thumbnail image data is not successfully achieved within the predetermined number of retries (S13: No), the controller 21 waits for a user input as to whether to continue printing of the current page (S14). Specifically, the controller 21 causes the display device of the PC 10 and the LCD of the user I/F 29 of the printer 20 to display a message that the thumbnail image data cannot be stored, and causes the user to select one of "attempt to print a next page" without printing the current page and "reattempt to store the thumbnail image data." This selecting operation may be performed through any one of the input device of the PC 10 and the user I/F 29.

When the user selects in S14 "attempt to print a next page" (S15: Yes), the controller 21 goes back to S2. Meanwhile, when the user selects "reattempt to store the thumbnail image data" (S15: No), the controller 21 goes back to S12.

In the step S16, the controller 21 prints, with the printing unit 26, the image (the page data) for which the RIP processing has been performed in S3 (S16). In this step, the controller 21 issues, to the printing unit 26, an image printing instruction to cause the printing unit 26 to print the image on a sheet. When the printing is not successfully achieved due to a paper jam caused during execution of the printing (S17: No), the controller 21 updates the name of the thumbnail image data with "(the page number)-(the total number of pages of the print data)-miss" (S18), and thereafter goes to S19. It is noted that when the corresponding thumbnail image data is not stored in the thumbnail storage unit 33, the controller 21 stores the thumbnail image data stored on the RAM of thereof into the thumbnail storage unit 33 with the name "(the page number)-(the total number of pages of print data)-miss" attached to the thumbnail image data. After that, the controller 21 deletes the thumbnail image data stored on the RAM thereof.

Subsequently, the controller 21 waits for a user input as to whether to continue printing of the current page (S19). Specifically, the controller 21 causes the display device of the PC 10 and the LCD of the user I/F 29 of the printer 20 to display a message that the thumbnail image data cannot successfully be printed, and causes the user to select one of "terminate the print job" and "reattempt to print the current page." This selecting operation may be performed through any one of the input device of the PC 10 and the user I/F 29.

When the user selects in S19 "reattempt to print the current page" (S20: Yes), the controller 21 changes the name of the thumbnail image data corresponding to the page back to "(the page number)-(the total number of pages of print data)," and thereafter the controller 21 goes back to S16. Meanwhile, the user selects "terminate the print job" (S20: No), the controller 21 advances to S22.

In S21, the controller 21 determines whether the page printed in S16 is the final page (S21). When the page printed in S16 is not the final page (S21: No), the controller 21 goes back to S2.

When the page printed in S16 is the final page (S21: Yes), the controller 21 performs a print completing process (S22). In the print completing process, although a detailed explanation of it will be given later, the controller 21 updates the name of the folder created in S8 depending on whether printing operations have normally been completed for all of the pages. After that, the controller 21 terminates the print control process.

(1. 3. 2.) Transmission Determining Process

A procedure of the transmission determining process, to be executed in S5 of the print control process, will be described with reference to FIG. 5.

In the transmission determining process, the controller 21 first determines whether the setting for performing the image feature extraction is active (S31). The image feature extraction is to determine whether a target page is a particular page of which thumbnail image data is to be stored, on the basis of information on the target page. The setting as to whether to perform the image feature extraction is previously configured through the user I/F 32 of the print data management device 30.

When the setting for performing the image feature extraction is not active (S31: No), the controller 21 determines whether an output page condition is satisfied (S32). The output page condition is a condition under which the thumbnail image data of a target image is stored on the thumbnail storage unit 33 as a record of the history, and previously set through the user I/F 32 of the print data management device 30 to determine at intervals of how many pages the thumbnail image data is to be stored.

When the target page does not meet the output page condition (S32: No), the controller 21 sets an output flag for the target page OFF (S33), and then terminates the transmission determining process. Meanwhile, when the target page meets the output page condition (S32: Yes), the controller 21 sets the output flag ON (S24), and terminates the transmission determining process.

Meanwhile, when the setting for performing the image feature extraction is active (S31: Yes), the controller 21 performs the image feature extraction (S35).

In the image feature extraction of S35, the controller 21 initially determines, based on the page data for which the RIP processing is performed in S3, how much shares, on the target page, the text area and the image area account for, respectively. Specifically, the controller 21 determines, when the text area accounts for a share on the page equal to or more than a predetermined ratio (e.g., one fourth of the whole area of the page), that the page has text information. Similarly, the controller 21 determines that when the image area accounts for a share on the page equal to or more than a predetermined ratio (e.g., one fourth of the whole area of the page), the page has image information. Then, the controller 21 classifies the page into one of four kinds of pages, i.e., a page having text information, a page having image information, a page having both text information and image information, and a page having neither text information nor image information.

Next, the controller 21 determines whether the page includes a predetermined character string such as "NO PRINTING PERMITTED" and "FOR INTERNAL USE ONLY." The predetermined character string is previously input and set through the user I/F 32.

The determination results as to whether the page includes the predetermined character string is stored on the storage unit 27. The storage unit 27 stores a data table as shown in FIG. 6 that has previously been created. The data table includes data group with three items of "text information," "image information," and "character string," for each page. Each item has an initial value "0." When a page has at least one of text information, image information, and the predetermined character string, the item for the page that corresponds to the at least one information is set to "1" on the data table. For example, as illustrated in FIG. 6, when the first page has text information, the item "text information" for the first page is set to "1".

Subsequently, the controller 21 determines whether the page is a particular page (S36). In this step, the controller 21 checks each item for the page on the data table, and determines that the page is not a particular page when the values of the items "text information" and "image information" for the page are identical to those for the last (previously adjacent) page, and the item "character string" has the value "0."

Meanwhile, when the value of at least one of the items "text information" and "image information" for the page is different from that for the last page, or the item "character string" has the value "1," the controller 21 determines that the page is a particular page.

When determining that the page is a particular page (S36: Yes), the controller 21 adjusts a manner for displaying the thumbnail image data of the particular page (S37). In this step, based on the thumbnail image data created in S4, the controller 21 creates new thumbnail image data for highlighting the thumbnail image of the particular page. In addition, the controller 21 attaches, to the new thumbnail image data, a name "(the page number)-(the total number of pages to be printed based on the print data)-note." The newly created thumbnail image data is temporarily stored on the RAM of the controller 21. When there is thumbnail image data already stored on the RAM, the previous thumbnail image data is overwritten and updated with the new thumbnail image data. After that, the controller 21 sets the output flag ON (S34), and then terminates the transmission determining process.

Meanwhile, when determining that the page is not a particular page (S36: No), the controller 21 goes to the aforementioned step S32.

(1. 3. 3) Folder Creating Process

A procedure of the folder creating process, to be executed in S8 of the print control process, will be described with reference to FIG. 7.

In the folder creating process, the controller 21 initially acquires, from the storage unit 27, the name (the job ID) of the print job in execution (S41).

Subsequently, the controller 21 acquires, from the storage unit 27, the name of the user who has started the print job in execution using the PC 10 (S42).

Next, the controller 21 acquires the date and time from the clock 28 (S43).

Then, based on the information acquired in S41 and S43, the controller 21 determines the folder name (S44). Specifically, as shown in FIGS. 2 and 3, the controller 21 determines the folder name configured with the job ID, the user name, and the date and time. The controller 21 stores the determined folder name into the storage unit 27.

Subsequently, the controller 21 creates a folder with the folder name determined in S44 on the thumbnail storage unit 33 (S45). The controller 21 creates the folder in a folder previously created with the printer name on the thumbnail storage unit 33. When there is no folder with the printer name, the controller 21 creates a new folder with the printer name, and creates the folder with the folder name determined in S44 in the newly created folder.

When the folder creation in S45 is successfully achieved (S46: Yes), the controller 21 terminates the folder creating process. Meanwhile, when the folder creation in S45 is not successfully achieved (S46: No), the controller 21 performs a recovery operation (S47). Specifically, the controller 21 retries to create the folder up to a predetermined number of times. When the recovery operation is successfully performed (S48: Yes), the controller 21 terminates the folder creating process. Meanwhile, when the recovery operation is not successfully performed (S48: No), the controller 21 terminates the folder creating process and the print control process.

(1. 3. 4) Print Completing Process

A procedure of the print completing process, to be executed in S22 of the print control process, will be described with reference to FIG. 8.

In the print completing process, the controller 21 first reads a folder name corresponding to the print job out of the storage unit 27 (S51). Next, the controller 21 selects a folder with the above folder name from the thumbnail storage unit 33, and checks whether there is thumbnail image data with the name "(the page number)-(the total number of pages to be printed based on the print data)-miss" among thumbnail image data stored in the selected folder (S52).

When there is no thumbnail image data with the name "(the page number)-(the total number of pages to be printed based on the print data)-miss" among thumbnail image data stored in the selected folder (S53: No), the controller 21 modifies the folder name to attach "-success" to the end thereof (S54). Then, the controller 21 goes to S58. Meanwhile, when there is thumbnail image data with the name "(the page number)-(the total number of pages to be printed based on the print data)-miss" among thumbnail image data stored in the selected folder (S53: Yes), the controller 21 reads all relevant pieces of thumbnail image data out of the storage unit 27, and based on the thumbnail image data read out, the controller 21 creates new thumbnail image data for highlighting relevant thumbnail images (S55). Then the controller 21 stores the newly created thumbnail image data onto the thumbnail storage unit 33, replacing, with each piece of the new thumbnail image data, a piece of thumbnail image data of the same page based on the same print job that has been stored until then on the thumbnail storage unit 33 (S56). Thereafter, the controller 21 modifies the folder name to attach "-failure" to the end thereof (S57). Then the controller 21 proceeds to S58.

Subsequently, the controller 21 determines whether the modification of the folder name is successfully achieved (S58). When the modification of the folder name is successfully achieved (S58: Yes), the controller 21 terminates the print completing process. Meanwhile, when the modification of the folder name is not successfully achieved (S58: No), the controller 21 performs the recovery operation (S59). Specifically, the controller 21 retries to modify the folder name up to a predetermined number of times. After that, the controller 21 terminates the print completing process regardless of whether the modification of the folder name is successful.

(1. 4) Effects

According to the printing system 1 configured as above, it is possible to (a) certainly save a history of printing operations and (b) make a user adequately grasp an execution history of a print job.

To describe the above effect (a) more specifically, the thumbnail image data of the page to be printed is stored on the thumbnail storage unit 33 of the print data management device 30 before the printing of the page is started. Since the page is printed responsive to that, it is possible to certainly record the history of printing operations.

To describe the above (b) more specifically, as mentioned above, the user can confirm the history of printing operations by checking thumbnail images. Therefore, without having to open a file of each image data, the user can quickly grasp what kind of image data is stored. Further, the thumbnail image data is sequentially stored in accordance with progress of the print job. Hence, even though multiple pages are printed based on a single piece of image data, it is possible to make the user grasp to what page, among the multiple pages, the printing operation based on the image data progresses.

In addition, the name of each thumbnail image data stored includes various kinds of information such as the total number of pages to be printed, the page number of a target page, and failure in printing the target page. Thus, by reference to the name of the thumbnail image data, the user can acquire information other than an image of the thumbnail image data.

Further, the thumbnail image data is stored in a single folder for each piece of print data. The name of the folder includes various kinds of information such as the name (the job ID) of the print job, the name of the user who started the printing operation based on the print job, the date and time when the folder was created, and the result of the printing operation. Therefore, an administrator can easily grasp when a target printing operation is performed, by whom, and to print what kind of data.

Further, thumbnail image data of a target page to be printed is displayed in a highlighted manner when the type of information contained on the target page differs from that on the last (previously adjacent) page, when the target page has a predetermined character string, or when the target page is not successfully printed. Thus, the user can easily find noteworthy pages by reference to the history.

Further, by setting the output page condition, it is possible to set the number of pages (a page interval), at intervals of which the thumbnail image data is to be stored. Therefore, with a wide page interval previously set, it is possible to quickly confirm the history. Meanwhile, when a narrow page interval is previously set, e.g., when the thumbnail image data of each of the pages is to be stored, it is possible to confirm a detailed history. It is noted that even though a wide page interval is previously set, as the thumbnail image data of a page identified as a particular page is stored, it is possible to avoid overlooking important thumbnail images.

Further, since the stored thumbnail image data can be confirmed not only at the print data management device 30 but as well at a client PC 10, the user who has instructed the printer 20 to perform printing can grasp the proceeding of the printing.

Second Embodiment

A configuration of a printing system 1 in a second embodiment is generally the same as the first embodiment. Nevertheless, as the processes by the controller 21 are partially modified, the modified process will hereinafter be described.

(2. 1) Processes by Controller

In the second embodiment, the print control process is partially different from that in the first embodiment, and a thumbnail creating process is executed instead of the transmission determining process.

(2. 1. 1) Print Control Process

A procedure of the print control process in the second embodiment will be described with reference to FIG. 9. It is noted that in the print control process of the second embodiment, steps for executing the same operations as the process of the first embodiment shown in FIG. 4 will be provided with the same reference characters as FIG. 4. Further, explanations about the steps for the same operations will be omitted. Hereinafter, the differences between the first and second embodiments will be described.

In the print control process of the second embodiment, after execution of the RIP processing in S3, the controller 21 performs a thumbnail creating process (S101). In the thumbnail creating process, the controller 21 determines the type of the thumbnail image data and creates thumbnail image data to be displayed in a manner different depending on the determined type of the thumbnail image data (a detailed explanation about it will be given later). After that, the controller 21 advances to S6, in which and the subsequent steps the controller 21 executes the same operations as the first embodiment.

(2. 1. 2) Thumbnail Creating Process

A procedure of the thumbnail creating process, which is performed in S101 of the print control process, will be described with reference to FIG. 10.

In the thumbnail creating process, the controller 21 initially controls the image feature extracting unit 25 to perform the image feature extraction (S111). In this step, the controller 21 performs the same operation as the aforementioned step S35 of FIG. 5. Specifically, in S111, the controller 21 classifies a target page into one of a page having text information, a page having image information, a page having both text information and image information, and a page having neither text information nor image information.

Subsequently, the controller 21 creates thumbnail image data of the target page to be displayed in a manner different depending on the type determined in S111 (S112). Specifically, as illustrated in FIG. 11, a page having text information is displayed with the background thereof being colored (see 121 in FIG. 11), and a page having image information is displayed with the surrounding areas thereof being colored (see 122 in FIG. 11). Further, a page having both text information and image information is displayed with the background and the surrounding areas thereof being colored (see 123 in FIG. 11), and a page having neither text information nor image information is not highlighted (see 124 in FIG. 11). It is noted that FIG. 11 shows a state where the print control process is completed in the second embodiment.

Next, the controller 21 determines whether the target page meets the output page condition (S113). When the target page does not meet the output page condition (S113: No), the controller 21 sets the output flag OFF (S114) and terminates the thumbnail creating process. Meanwhile, When the target page meets the output page condition (S113: Yes), the controller 21 sets the output flag ON (S115) and terminates the thumbnail creating process. The operations in S113 to S115 are the same as S32 to S34 in FIG. 5.

(2. 2) Effects

According to the printing system 1 configured as above in the second embodiment, it is possible to certainly save the print history as well as the first embodiment. In addition, it is possible to discriminate what type of information is contained on a page corresponding to the created thumbnail image data, based on the manner in which the thumbnail image data is displayed. Thus, it is possible to easily find particular information (record) from the thumbnail image data displayed as print history information.

Third Embodiment

A configuration of a printing system 1 in a third embodiment is generally the same as the first embodiment. Nevertheless, as the processes by the controller 21 are partially modified, the modified process will hereinafter be described.

(3. 1) Processes by Controller

In the third embodiment, the transmission determining process is partially different from that in the first embodiment.

(3. 1. 1) Transmission Determining Process

A procedure of the transmission determining process will be described with reference to FIG. 12. It is noted that in the transmission determining process of the third embodiment, steps for executing the same operations as the process of the first embodiment shown in FIG. 5 will be provided with the same reference characters as FIG. 5. Further, explanations about the steps for the same operations will be omitted. Hereinafter, the differences between the first and third embodiments will be described.

In the transmission determining process of the third embodiment, when the setting for performing the image feature extraction is active (S31: Yes), the controller 21 performs an image similarity level determination (S121).

In this step, the controller 21 controls the image feature extracting unit to perform the image feature extraction and determines how much shares, on the target page, the text area and the image area account for, respectively. The result of the determination is stored on the storage unit 27. The storage unit 27 stores a data table previously created as shown in FIG. 13. The data table has items "text area," "image area," and "determination," for each page. The controller 21 determines the shares on the target page that the text area and the image area account for, respectively, and registers the determined shares (%) in the corresponding items, respectively. For the second page and the following pages, when the share of any of the items varies by a predetermined threshold (in the third embodiment, 20%) or more from that of the last (previously adjacent) page, the controller 21 registers "1" in the item "determination." Meanwhile, when the share of each of the items varies by less than the predetermined threshold from that of the last page, the controller 21 registers "0" in the item "determination."

Next, the controller 21 determines whether the target page is a particular page (S122). In this step, the controller 21 checks the item "determination" for the target page on the data table. When "0" is registered in the item "determination" (S122: No), the controller 21 goes to S32. Meanwhile, when "1" is registered in the item "determination," the controller 21 determines that the target page is a particular page (S122: Yes), the controller 21 goes to S37.

(3. 2) Effects

According to the printing system 1 configured as above in the third embodiment, it is possible to certainly save the print history as well as the first embodiment. Additionally, it is possible to discriminate that the contents of a target page corresponding to the created thumbnail image data remarkably vary from those of the last (previously adjacent) page, e.g., that the amount of text or images written on the target page remarkably increases or decreases, based on the manner in which the thumbnail image data is displayed. Thus, it is possible to easily find a page of which the contents remarkably vary.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein. For example, the following modifications are possible.

[Modifications]

In the aforementioned embodiments, the name of the thumbnail image data of the page for which a printing operation is not successfully achieved is updated with "(the page number)-(the total number of pages of the print data)-miss." However, alternatively, the name of the thumbnail image data of the page for which a printing operation is successfully achieved may be updated. For example, when the printing operation is successfully achieved in S14 of FIG. 4, the name of the thumbnail image data may be updated with "(the page number)-(the total number of pages of the print data)-success."

In the aforementioned embodiments, modified is the manner for displaying the thumbnail image data of the page for which a printing operation is not successfully achieved. However, the manner for displaying the thumbnail image data of the page for which a printing operation is successfully achieved may be modified. Further, the respective manners for displaying the both types of thumbnail image data may be modified.

Moreover, the manner for highlighting a noteworthy thumbnail image is not limited to the aforementioned manners. A noteworthy thumbnail image may be highlighted in any manner with the color, the shape, and/or the location of the image being modified. For example, a noteworthy thumbnail image may be highlighted such that the thumbnail display screen is displayed as if the screen is viewed through a fish-eye lens with the thumbnail image located in the center. Alternatively, a noteworthy thumbnail image may be displayed as an animated image.

In the aforementioned embodiments, a separated piece of image data is created for the thumbnail image corresponding to each page. However, a single piece of image data may be created for the thumbnail images of the all pages. According to the printing system 1 configured in this manner, since a single piece of image data is created for each print job, it is possible to decrease the number of files to manage and thus provide easy management of the print history. Specifically, after execution of S22 in the print control process, the controller 21 may create a single piece of image data for displaying all pieces of the thumbnail image data based on the print job that are stored on the storage unit 27, and replace the thumbnail image data based on the print job that is stored on the thumbnail storage unit 33 with the created image data.

Additionally, the image feature extraction in S35 of FIG. 5 may be implemented based on the created thumbnail image data instead of the RIP-processed data which is a larger amount of data than the thumbnail image data. Thereby, although it leads to a lower accuracy of the determination as to whether a target page is a particular page, it is possible to promptly perform the image feature extraction.

In the aforementioned embodiments, the name of the folder to store the thumbnail image data relevant to a print job is modified depending on whether all the pages are successfully printed based on the print job. However, the name of the folder to store the thumbnail image data may be modified depending on whether there is, in the folder, thumbnail image data with the name "(the page number)-(the total number of pages to be printed based on the print data)-note."

In the aforementioned embodiments, a single folder is created based on a single piece of print data. However, a single folder may be created in accordance with a different requirement. For example, a single folder is not created for each piece of print data, but the thumbnail image data may be stored in the folder corresponding to the printer 20. Alternatively, the thumbnail image data may be stored in a folder classified based on the date and time.

In the determination in S36 of FIG. 5 as to whether a target page is a particular page, when at least one of the items "text information" and "image information" for the target page on the data table has a value different from that for the last (previously adjacent) page, the target page is determined to be a particular page. However, when there are one or more pages different from the other same type of pages among all the pages registered on the data table shown in FIG. 6, the different pages may be determined to be particular pages.

When the thumbnail image data of different pieces of print data is registered in the same folder, for example, a data table may be registered in the folder. When a print job is executed to register thumbnail image data in the folder, the thumbnail image data may be registered so as to be added onto the data table. Thereby, it is possible to make the above determination as to whether a target page is a particular page in comparison with thumbnail image data that has already been stored in the folder.

Further, the manner for displaying the thumbnail image data may be changed depending on the time when the printing operation has been performed for the page corresponding to the thumbnail image data. For example, instead of S111 and S112 in FIG. 10, an alternative operation may be performed to highlight the thumbnail with a regular color when the printing operation is performed during a period after 8 o'clock until 20 o'clock, yellow for the printing operation during a period after 20 o'clock until 24 o'clock, red for the printing operation during a period after 24 o'clock until 8 o'clock. Thereby, it is possible to easily know the time when the thumbnail image data was created, i.e., when the printing operation was performed for the corresponding page only by referring to the history. Hence, for instance, it is possible to easily find, in the history, a record of a printing operation performed during off-hours that might be an improper printing operation. This effect is clearly exerted especially when the thumbnail image data based on different pieces of print data is stored in the same folder. Nevertheless, even when a folder is created for each piece of print data with a name including the time when the printing operation has been performed based on the print data, it is possible to sensuously recognize the time of the printing operation through the manner for displaying the thumbnail image data, and thus easily find an improper printing operation.

In the aforementioned embodiments, the print data is transmitted by a PC 10 to the printer 20. However, for example, the printer 20 may be connected with a storage medium such as a flash memory, and the printer 20 may perform a printing operation based on data stored on the storage medium.

Further, thumbnail image data corresponding to a page being currently printed may be highlighted. In this case, the controller 31 of the print data management device 30 may be configured to issue an instruction to display the thumbnail image data on the LCD of the user I/F 32 in a modified manner. According to such a configuration, new thumbnail image data does not have to separately be created on the side of the printer 20.

In the aforementioned embodiments, the thumbnail storage unit 33 of the print data management device 30 connected with the printer 20 via the network 2 is exemplified as a storage device to store the thumbnail image data. However, such a storage device may be incorporated inside the printer 20.

What is claimed is:

1. A printer configured to be connected communicably with a storage device, comprising:
  a printing unit configured to print one or more pages with images formed thereon, based on print data;
  a processor; and
  memory storing computer-executable instructions that, when executed by the processor, cause the printer to:
  create thumbnail image data corresponding to each of the pages to be printed by the printing unit;
  create a name for the thumbnail image data corresponding to each of the pages to be printed;
  store, into the storage device, the thumbnail image data with the created name attached thereto;
  determine whether the thumbnail image data has been successfully stored into the storage device;
  control the printing unit to initiate printing of a page corresponding to the thumbnail image data successfully stored in response to determining that the thumbnail image data has been successfully stored into the storage device;
  update the name of the thumbnail image data depending on whether the page corresponding to the thumbnail image data is successfully printed; and
  store the thumbnail image data with the updated name displacing the previous name, in the storage device when the name is updated.

2. The printer according to claim 1, wherein the memory further stores computer-executable instructions that, when executed by the processor, further cause the printer to:
  acquire a total number of the pages to be printed based on the print data,
  wherein each name of the thumbnail image data corresponding to each of the pages to be printed includes the total number of pages acquired and a page number of the page corresponding to the thumbnail image data.

3. The printer according to claim 1, wherein the memory further stores computer-executable instructions that, when executed by the processor, further cause the printer to:
  create a folder name of a folder to store the thumbnail image data;
  create, in the storage device, the folder to store the thumbnail image data, with the created folder name attached thereto; and
  store the thumbnail image data into the folder.

4. The printer according to claim 1, wherein the memory further stores computer-executable instructions that, when executed by the processor, further cause the printer to:
- create, in the storage device, a folder for each print data, and
- store the thumbnail image data corresponding to each of the pages to be printed based on the print data, into the folder created for the corresponding print data.

5. The printer according to claim 4, wherein the memory further stores computer-executable instructions that, when executed by the processor, further cause the printer to update the folder name of the folder that stores the thumbnail image data corresponding to each of the pages based on the print data, depending on whether all of the pages based on the print data are successfully printed.

6. The printer according to claim 1, wherein the memory further stores computer-executable instructions that, when executed by the processor, further cause the printer to:
- when a page is unsuccessfully printed based on the print data, create new thumbnail image data corresponding to the unsuccessfully printed page, the new thumbnail image data being adapted to be displayed in a different manner from previous thumbnail image data corresponding to the unsuccessfully printed page; and
- replace the previous thumbnail image data stored in the storage device with the new thumbnail image data.

7. The printer according to claim 1, wherein the memory further stores computer-executable instructions that, when executed by the processor, further cause the printer to:
- when a page is successfully printed based on the print data, create new thumbnail image data corresponding to the successfully printed page, the new thumbnail image data being adapted to be displayed in a different manner from previous thumbnail image data corresponding to the successfully printed page; and
- replace the previous thumbnail image data stored in the storage device with the new thumbnail image data.

8. The printer according to claim 1, wherein the memory further stores computer-executable instructions that, when executed by the processor, further cause the printer to create the thumbnail image data corresponding to each of the pages based on the print data, the thumbnail image data being adapted to be displayed in various manners depending on a time when the thumbnail image data is created.

9. The printer according to claim 1, wherein the memory further stores computer-executable instructions that, when executed by the processor, further cause the printer to:
- classify each of the pages to be based on the print data into one of different types; and
- create the thumbnail image data corresponding to each of the pages based on the print data, the thumbnail image data being adapted to be displayed in various manners depending on the type of each of the pages.

10. The printer according to claim 9, wherein the memory further stores computer-executable instructions that, when executed by the processor, further cause the printer to:
- identify a particular page of the print data that is classified into a different type than an immediately preceding page; and
- create thumbnail image data corresponding to the particular page so as to be displayed in a highlighted manner.

11. The printer according to claim 9, wherein the memory further stores computer-executable instructions that, when executed by the processor, further cause the printer to:
- identify a particular page including a predetermined character string; and
- create thumbnail image data corresponding to the particular page so as to be displayed in a highlighted manner.

12. The printer according to claim 9, wherein the memory further stores computer-executable instructions that, when executed by the processor, further cause the printer to classify each of the pages into one of the different types based on a percentage of the page that contains text information and a percentage of the page that contains image information.

* * * * *